United States Patent Office

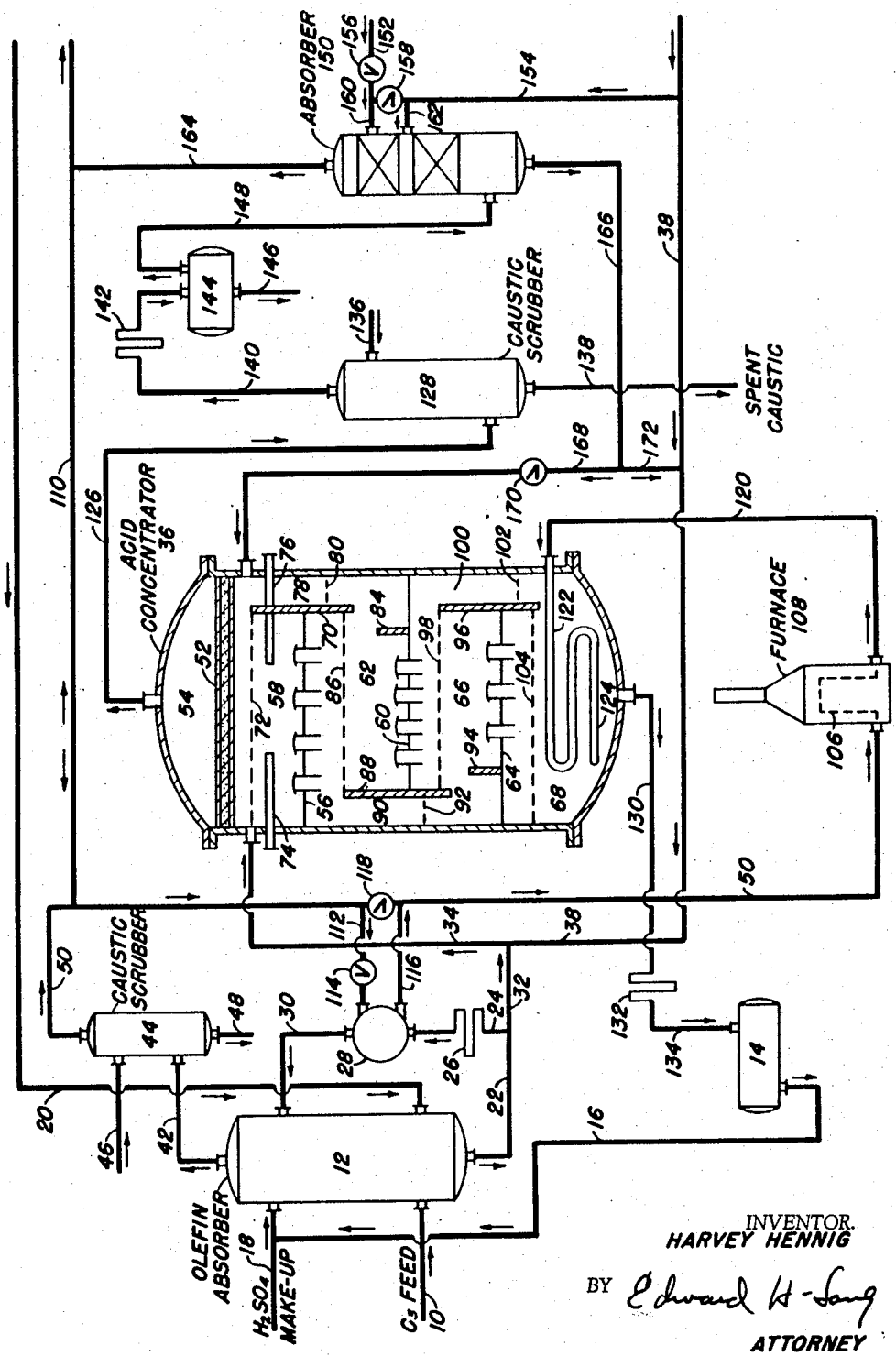

2,868,848
Patented Jan. 13, 1959

2,868,848

MANUFACTURE OF ALIPHATIC ALCOHOLS

Harvey Hennig, Crystal Lake, Ill., assignor to The Pure Oil Company, Chicago, Ill., a corporation of Ohio Application August 19, 1955, Serial No. 529,505

4 Claims. (Cl. 260—639)

The present invention relates to a process and apparatus for the manufacture of aliphatic alcohols from hydrocarbons and sulfuric acid and, more particularly, to such a process wherein the steps of springing the alcohol from the reaction mixture and concentrating the acid for reuse are combined in a single operation. The method described herein eliminates certain prior art steps and dispenses with the necessity of using expensive, high-vacuum, acid concentrators and complicated mist separators.

A primary object of the invention is to provide a new, facile, and inexpensive process for making aliphatic alcohols such as isopropyl alcohol from a mixture of saturated and unsaturated hydrocarbon gases.

Another object is to utilize unreacted hydrocarbons to release the isopropyl alcohol from the reaction mixtures and simultaneously concentrate the acid reactant.

Further objects of the invention will appear in or be obvious from the description which follows.

Broadly, the invention relates to the discovery that the unreacted saturated hydrocarbons from the reaction can be used to release the aliphatic alcohol from the sulfuric acid-hydrocarbon reaction mixture, while simultaneously concentrating the acid.

In a known method of preparing isopropyl alcohol, a liquid propylene feed stock, along with certain recycled hydrocarbons, is absorbed in 75 percent sulfuric acid in a series of agitated reactors. The reactant mixture passes to settlers and so-called sulfated propylene consisting of diisopropyl sulfate and isopropyl acid sulfate is separated. This reactant mixture is mixed with water and sent to a steam stripping-zone or hydrolyzer-stripper wherein conversion to an acid solution of isopropyl alcohol, ether and polymers takes place. Dilute sulfuric acid is drawn off from the bottom of the hydrolyzer-stripper and concentrated in a separate vessel, or set of vessels, for re-use. The reaction products are next steam-stripped from the acid in the same column and leave as overhead vapors. Caustic solution is used to neutralize the vapors which are then condensed. The crude isopropyl alcohol, or condensate which consists of alcohol, ether and polymers, is sent to an ether column for ether separation. The overhead vapors from the ether column are condensed and separated into two layers. The main portion of the condensate may be recycled to the ether column without separation of the layers. A portion of the liquid layer is sent from the main reflux stream to a decanter for layer separation. In the decanter, an upper layer consisting of ether and small proportions of alcohol and water, and a lower layer containing water and small amounts of ether and alcohol separate.

The lower, water-rich layer may be decanted from the upper layer and refluxed back to the tower continuously along with the main reflux stream going to the column. The recycled ether or ether-free isopropyl alcohol, along with water and polymers, is conveyed to a fractionation column. The condensed overhead from this column contains about 87 percent isopropyl alcohol in water. The polymer by-product is removed as a sidestream, and water containing only traces of isopropyl alcohol comes off as bottoms for recycle to the hydrolyzer-stripper.

The main reaction takes place at 300 to 400 p. s. i. g. and all of the steps except propylene feed delivery take place at atmospheric pressures without the necessity of refrigeration. By the prior art methods high yields of isopropyl alcohol from propylene may be obtained with propylene losses amounting to only about 5% in all. The ether is subjected to sulfation and is recycled to extinction.

Although the invention may be applied to the manufacture of any aliphatic alcohol from an unsaturated hydrocarbon-containing mixture, such as the preparation of secondary butyl alcohol from butylene, tertiary butyl alcohol from isobutylene and ethyl alcohol from ethylene, it will be described, and is particularly applicable, in relation to the preparation of isopropyl alcohol from propylene-containing hydrocarbon mixtures by reaction with sulfuric acid followed by hydrolysis and separation of the isopropyl alcohol. Broadly stated, the process comprises subjecting a hydrocarbon mixture containing the desired unsaturated hydrocarbon and associated saturated hydrocarbons to treatment with dilute sulfuric acid, having a concentration of about 70 to 85 wt. percent of acid, in an absorber, separating a reaction mixture containing isopropylene sulfate, hydrolyzing the reaction mixture, separating unreacted saturated hydrocarbons from the absorber, preheating the saturated hydrocarbons to relatively high temperatures under time and temperature conditions to avoid cracking thereof, conducting the hydrolyzed reaction mixture and highly heated saturated hydrocarbon to contact under conditions whereby the aliphatic alcohol is sprung from the reaction mixture and the water present is evaporated off by the heated saturated hydrocarbon to simultaneously concentrate the acid in condition for re-use in the process. The reactions can be carried out in batch or continuous operations and various forms of contactor zones may be used. The invention will be described as a continuous operation in which counter-current contact is used to effect the various reactions and separations but this is to be construed as merely illustrative.

In accordance with a more specific embodiment of the invention, isopropyl alcohol is manufactured from propanepropylene mixtures using sulfuric acid, the isopropylene sulfate is hydrolyzed and the isopropyl alcohol produced is released from the dilute sulfuric acid in a series of at least two concentrating zones, the first of which accomplishes the release of the major portion of alcohol and the second of which accomplishes the concentration of the acid in the major portion. These concentrating zones are bathed in an atmosphere of hot vapors, the unreacted portion of the feed, to supply at least a portion of the heat required to concentrate the dilute sulfuric acid and spring the isopropyl alcohol.

The invention is best explained by reference to the attached drawing which is a flow diagram of the complete process, with the acid concentrator shown in more detailed cross-section.

Referring to the drawing, a hydrocarbon feed consisting essentially of propane and propylene flows through line 10 into the bottom of olefin absorber 12 for counter-current contact with recycle sulfuric acid from surge tank 14 conveyed through line 16. Fresh make-up sulfuric acid is added as needed through line 18. Line 18 may enter absorber 12 tangential to the curved wall thereof to increase the turbulence within. The sulfuric acid enters absorber 12 near the top. Absorber 12 may be any suitable device for contacting the acid and hydrocarbon, such as a countercurrent packed column, or a series of mixing vessels arranged in a suitable manner. Any isopropyl ether formed in the process may be recycled from the purification system (not shown) through line 20 into the bottom of absorber 12.

A mixture of sulfuric acid, sulfated propylene, and dissolved hydrocarbons is removed from the bottom of absorber 12 via line 22. A portion of the reaction mixture may be recycled back to absorber 12 through line 24, cooler 26, heat exchanger 28 and line 30 in order to maintain a suitable reaction temperature. The continuous supply of reaction products removed at line 32 is passed through line 34 into the top of acid concentrator and separator 36. Line 34 may enter the top of concentrator 36 at a point tangential to the wall thereof to increase the turbulence. Recycle water from the isopropyl alcohol purification system (not shown) enters the system through line 38 which joins line 32 and mixes with the reaction products passing into line 34 and into acid concentrator 36. Unreacted hydrocarbons, comprising principally propene, pass overhead from absorber 12 through line 42 into Unreacted hydrocarbons, comprising principally propane, acids from the hydrocarbons. Caustic is introduced into scrubber 44 by line 46 and spent caustic from caustic scrubber 44 is removed by line 48. The unreacted hydrocarbons comprising principally propane leave caustic scrubber 44 by line 50 for further use in the process as will be explained.

The sulfuric acid, containing propylene as isopropyl sulfate or acid sulfate, is diluted with recycle water from line 38 and the hydrolysis reaction forming isopropyl alcohol is initiated in line 34. This reaction mixture enters the top of acid concentrator 36 wherein the hydrolysis is completed, the alcohol released and the acid concentrated.

These reactions may take place in at least two zones, and depending on the acid concentration required and the conditions used, as many as six zones may be employed. For purposes of illustration, acid concentrator 36 is shown with four zones. The demister 52, comprising two parallel, spaced, perforated plates with inert porous material therebetween, defines a top collecting space 54 under the top of the concentrator 36. Bubble cap tray 56 and demister 52 define a first zone 58. Between tray 56 and tray 60 is second zone 62 and the lower location of tray 64 defines the bottom of third zone 66. Zone 68, the bottom concentrating zone, is under tray 64. Weir 70 extending across one side of the concentrator 36 maintains liquid level 72 in the first zone 58. The liquid is heated by steam-operated bayonet-type heaters 74 and 76 extending radially into the liquid zone. A plurality of spaced radial bayonet-type heaters extending into the zones best meet the heat requirements therein. Liquid from zone 58 passes over the top of weir 70 into passage 78 and will attain liquid level 80 therein due to weir 88 in the second zone. Smaller weir 84 helps control the passage of liquid into zone 62 maintaine at level 86. Liquid from zone 62 passes over weir 88 into passage 90, maintaining liquid level 92 therein due to the cooperation of weirs 94 and 96. Liquid maintained at level 98 in zone 66 spills over weir 96 into passage 100 and is held at liquid level 102 therein. The final concentrated acid level in zone 68 is indicated at 104.

Some heat for the operation of concentrator 36 is supplied by the saturated hydrocarbon, namely, propane, coming from caustic scrubber 44, passing through line 50 into coil 106 of furnace 108 where it is heated to a temperature of about 600 to 1100° F. The conditions of residence time and temperature in coil 106 are maintained so as to prevent any cracking of the hydrocarbon gas. This supply of propane is augmented by any excess propane from the process which may be recycled into line 50 by line 110. A portion or all of this combined propane stream in line 50 may be directed to heat exchanger 28 via line 112 controlled by throttling valve 114 and returned therefrom by line 116. Valve 118 in cooperation with valve 114 is used to control the flow of propane into the system.

Preheated propane from furnace 108 passes through line 120 into coil 122 located in zone 68 in the bottom of concentrator 36. Coil 122 terminates in dispersing means 124 through which the propane is dispersed into the concentrated acid solution in zone 68. Coil 122 may be omitted and is used only to cool the incoming preheated propane slightly before contact with the acid, should the temperature be too high, thus preventing any possible side reactions with the hot concentrated acid. The propane vapors bubble up through the liquid contained in the various zones of the concentrator and intimate contact is brought about by the bubble-cap trays 64, 60 and 56 as the propane proceeds upwardly.

In operation, the major portion of isopropyl alcohol is released in zones 58 and 62, while the concentration of the sulfuric acid takes place in zones 58, 62, 66, and 68. A mixture of crude isopropyl alcohol, propane and some water vapor leaves concentrator 36 by line 126 passing to caustic scrubber 128. The resulting concentrated acid from zone 68 leaves concentrator 36 by line 130 passing through cooler 132 and line 134 into surge tank 14 for recycle to the absorber 12 via line 16.

In caustic scrubber 128 the last traces of sulfuric acid are removed before the vapors of isopropyl alcohol are condensed. For this purpose fresh caustic is introduced into scrubber 128 at line 136 and spent caustic is removed at line 138. The washed reaction products pass overhead through line 140 into condenser 142 and are collected in receiver 144. Crude condensed isopropyl alcohol is drawn off the bottom of receiver 144 by line 146 and sent to a purification system not shown. The isopropyl alcohol may be purified by azeotropic distillation in the conventional manner. This operation separates the isopropyl alcohol from any isopropyl ether formed which is recycled back into the system through line 20 as previously described. Water separated in this purification is returned by line 38.

Vapor consisting of propane, traces of lighter hydrocarbons, isopropyl alcohol and some dissolved isopropyl ether is removed from the top of receiver 144 through line 148 and sent to absorber 150. In absorber 150 any isopropyl alcohol present is recovered by absorption in fresh make-up water introduced at line 152 along with a portion of the recycle water which is diverted from line 38 into line 154. The introduction of these combined water streams into absorber 150 is controlled by valves 156 and 158 through branch lines 160 and 162.

Substantially pure propane passes overhead from absorber 150 by line 164 and may be withdrawn from the system or recycled back through line 110. A mixture comprising water containing small amounts of isopropyl alcohol leaves absorber 150 by line 166. This water-alcohol stream may be transferred to the top of the concentrator 36 by means of line 168 controlled by valve 170 or is passed through branch line 172 into line 38 for use in the hydrolysis reaction.

In order to illustrate the invention the following example is given:

*Example*

Sulfuric acid diluted to 75% by weight and a propane-propylene gas mixture are introduced into absorber 12 using an acid-to-propylene mol ratio of 1.2 to 1 based on 100% sulfuric acid. The pressure is maintained at about 300 p. s. i. g. A reactant mixture comprising a mixture of sulfuric acid, sulfated propylene and dissolved propane and propylene is removed from absorber 12 and diluted with recycle water from the purification system to an acid strength of about 30%. The heat of dilution raises the dilute acid reaction mixture to a temperature of about 150° F. This mixture is introduced through line 34 into zone 58 of acid concentrator 36. The major portion of isopropyl alcohol formed from the dilution reaction is stripped out in zone 58 and passes off through zone 54 into line 126 along with some water. The acid solution in zone 58 has been raised to a concentration of about 36.9% by wt. and is heated to a temperature of about 230° to 240° F. by the remaining heat of the propane vapors augmented by steam coils (not shown). The heat input into this stage is about 11,000 B. t. u./gal. of isopropyl alcohol produced. The acid then passes to zone 62 where it is further heated to 240° to 250° F. by the propane vapors and steam coils and the acid is concentrated to about 44.3 wt. percent. About 10,000 B. t. u./gal. of isopropyl alcohol produced is required for this stage. The acid then passes to the third stage, zone 66, where it is heated and concentrated to about 60 wt. percent, and is boiling at a temperature of about 285 to 290° F. This stage requires about 9,500 B. t. u./gal. of isopropyl alcohol produced. In the last stage, zone 68, the final concentration of the acid to 60 to 75 wt. percent takes place. The heat requirement of about 6500 B. t. u./gal. of isopropyl is supplied by the incoming hot propane from furnace 70. About 3 mols of propane at 600° F. is required per mol of isopropyl alcohol produced. If a feed comprising 25 mol percent of propylene and 75 mol percent of propane is used, no propane recycle is necessary.

During this operation the acid concentrator 36 and the isopropyl alcohol absorber are operated at substantially atmospheric pressure. When operating at about 100° F. and a pressure of about 3 p. s. i. g., about four theoretical stages are required to remove virtually all of the isopropyl alcohol from the propane stream when employing about 1 mol of water per mol of isopropyl alcohol produced. In other words, the stoichiometric amount of make-up water required for the isopropyl alcohol production is sufficient to remove the non-condensed isopropyl alcohol carried by the propane from the acid concentrator 36.

It is thus seen that the essential steps of the process comprise the passage of the reactant mixture, comprising sulfated propylene, dissolved propane and propylene and sulfuric acid, into contact in a first stage with water, heating the diluted reactants to release the major portion of the isopropyl alcohol formed, passing the reactant mixture through successive stages of increased temperature ranging from 150° F. to 290° F. whereby the acid solution is concentrated through loss of water through heat absorbed from a preheated stream of propane ascending through the successive stages. The resulting concentrated recovered sulfuric acid is recycled back to the absorber zone, the crude isopropyl alcohol and water are caustic washed to remove traces of acid and the crude alcohol is separated, condensed and purified by distillation.

The number of acid concentrating stages will vary depending on the concentration of acid-reactant used, and the amount of heat applied at each stage. The process is greatly improved by the technique of using the superheated propane to contact the acid in the final concentrating stage. If the acid concentration used and the propane temperature are such that some reaction occurs between the acid and the propane, the gas is first cooled by passing it through coil 122 in the bottom of concentrator 36.

The process employs sulfuric acid at elevated temperatures, requiring that certain of the apparatus units be made of materials that are resistant to acid corrosion. If acid of sufficient concentration is employed, and if the temperature is kept sufficiently low; i. e., concentration above 70% and temperature below about 100° F., carbon steel can be employed for the olefin absorber 12. The dilute acid lines and acid concentrator 36 require special, corrosion-resistant materials. Lead or lead-lined pipe can be employed for the dilute acid lines and line 34. The concentrator can be constructed of materials such as high silicon iron such as Duriron, Hastelloy D, or a steel shell protected by a lead liner plus acid-resisting brick. The heaters, whether coils, bayonet, or exchanger-type heaters, cannot employ lead pipe if the steam pressure is too high for such material. Lead-lined steel, Duriron, Hastelloy D, or tantalum are preferred materials of construction for the heaters and auxiliary steam coils of concentrator 36.

The invention simplifies the process steps by combining the release of aliphatic alcohol and acid concentration reactions in one reactor utilizing the heat of vaporized unreacted saturated hydrocarbon from the hydrocarbon reaction mixture. The vacuum-producing equipment of the prior art is eliminated, since the reactions are carried out at substantially atmospheric pressure. The steam pressures, where steam is used, need not exceed 125 p. s. i. g., which adds to the cost reduction. There is also no need for a separate isopropyl alcohol stripping vessel or costly electrical mist precipitators. For practical purposes, the reaction is limited to the use of sulfuric acid ranging in concentration from 70 to 85%. Acid concentrations above this limit cause polymerization and if too weak an acid is used, the reaction efficiency is impaired. The alkali solutions used for the two caustic scrubbers may contain from 20 to 50% by wt. of alkali. The time of contact in absorber 12 is adjusted so that the maximum amount of unsaturated hydrocarbon is absorbed as is well known in the art. The water-dilution step and hydrolysis reaction, taking place in line 34 and zone 58, occurs fairly rapidly; therefore, no special precautions need be taken to complete this reaction other than thorough mixing. The reactions taking place in concentrator 36 are best carried out using the counter-current contact technique, since as the acid becomes more concentrated the temperature rises and it is desirable to contact the more concentrated acid with the hottest propane.

Since the aliphatic alcohol must be released from a more dilute acid solution than is used to absorb the unsaturated hydrocarbon in absorber 12, at least two zones are required to accomplish the release of alcohol formed by hydrolysis. Using a minimum of two zones in concentrator 36 would require temperatures of about 230–260° F. in the first zone, with the acid concentrations varying within the range of 36 to 60 wt. percent, and a temperature of about 365° to 370° F. in the second zone, with the acid concentrations varying from 60 to 75 wt. percent, utilizing the propane at the highest possible temperature short of cracking.

Instead of using the weir and passageway system to convey acid from one zone to the other in concentrator 36, a system of thermo-syphons may be used. In this embodiment the bubble trays extend across the entire cross-section of the tower and a conduit is supplied leading external the tower wall from one zone to the next lower zone. This conduit may have a V-bend at the point just below the entrance of the conduit into the next lower zone. Another expedient to transfer acid from zone to zone is to use an external conduit system with a tube heater, connected thereto.

Having thus described the invention, the only limitations attaching thereto appear in the appended claims.

What is claimed is:

1. The process of preparing isopropyl alcohol from a propane-propylene hydrocarbon mixture containing about 25 mol percent of propylene and about 75 mol percent of propane comprising contacting said hydrocarbon mixture with a sufficient amount of sulfuric acid having a concentration of at least about 75% by weight of sulfuric acid under conditions to convert said propylene to isopropylene sulfate in an absorber zone, separating propane from said absorber zone, separating a reaction mixture of sulfuric acid and isopropyl sulfate from said absorber zone, separately heating said propane to a temperature of 600° to 1100° F. under non-cracking conditions, subjecting said reaction mixture to dilution with water to produce isopropyl alcohol therein, subjecting said isopropyl alcohol-sulfuric acid reaction mixture to contacting with said preheated propane to release said isopropyl alcohol in a series of contacting zones maintained at about atmospheric pressure, the first zone being at a temperature of about 230–240° F. to raise the acid concentration to about 36 weight percent, the second zone being at a temperature of about 240 to 250° F. to raise the acid concentration to about 44 weight percent, the third zone being at a temperature of about 285 to 290° F. to raise the acid concentration to about 60 weight percent and the fourth zone being at a temperature of about 365 to 370° F. to raise the acid concentration to about 75 weight percent, recovering isopropyl alcohol from said first zone for purification and concentrated sulfuric acid from said last zone being substantially free of absorbed propylene.

2. The process of preparing a propyl alcohol which comprises contacting a mixture containing about 25 mole percent propylene and about 75 mole percent propane with sulfuric acid in an absorbing zone, said sulfuric acid having an acid strength of at least about 75 weight percent whereby to form the sulfate of said propylene, separately removing the unabsorbed propane and a reaction mixture containing the sulfate of said propylene from said absorbing zone, removing entrained sulfuric acid from said unabsorbed propane, preheating said sulfuric acid-free propane to a temperature of about 600° to 1100° F. under non-cracking conditions, subjecting said reaction mixture from said absorbing zone to hydrolysis in an initial hydrolyzing zone, passing the hydrolyzed reaction mixture into a series of acid concentrating zones operating at about atmospheric pressure in contact with said preheated sulfuric acid-free unabsorbed propane in each zone, maintaining at least one of said acid concentrating zones at a temperature of about 230° to 260° F., maintaining at least one subsequent acid concentrating zone at a temperature of about 365° to 370° F., removing concentrated sulfuric acid free of absorbed propylene from said last concentrating zone and having an acid concentration of at least about 75% by weight, said acid concentration being sufficient for re-use of said acid as the sulfonating agent in said absorbing zone and recovering a propyl alcohol from the effluent from the first of said acid concentrating zones.

3. The process in accordance with claim 2 in which the propyl alcohol is isopropyl alcohol, and wherein the acid produced from said 230° to 260° F. zone has an acid concentration of about 36 to 60 weight percent of sulfuric acid and the acid produced by said 365° to 370° F. zone has an acid concentration of at least about 75 weight percent of sulfuric acid.

4. The process in accordance with claim 2 in which the acid-to-propylene mole ratio in the absorbing zone is about 1.2-to-1 based on 100% sulfuric acid, and the absorber is operated at a pressure of about 300 p. s. i. g. above the pressure in said acid concentrating zones.

References Cited in the file of this patent

UNITED STATES PATENTS

| | | |
|---|---|---|
| 2,281,911 | Bannon et al. | May 5, 1942 |
| 2,365,264 | Groombridge et al. | Dec. 19, 1944 |
| 2,609,400 | Amick | Sept. 2, 1952 |

UNITED STATES PATENT OFFICE

CERTIFICATE OF CORRECTION

Patent No. 2,868,848                              January 13, 1959

Harvey Hennig

It is hereby certified that error appears in the printed specification of the above numbered patent requiring correction and that the said Letters Patent should read as corrected below.

Column 2, lines 61 and 62, for "detained" read -- detailed --; column 3, line 21, for "propone" read -- propane --; line 23, strike out "Unreacted hydrocarbons, comprising principally propane," and insert instead -- caustic scrubber 44 which removes dissolved or entrained --; line 58, for "maintaine" read -- maintained --.

Signed and sealed this 2nd day of June 1959.

(SEAL)
Attest:

KARL H. AXLINE                                                  ROBERT C. WATSON
Attesting Officer                                         Commissioner of Patents